(12) United States Patent
Dong et al.

(10) Patent No.: US 11,698,823 B2
(45) Date of Patent: Jul. 11, 2023

(54) APPLICATION INTERFACE IMPLEMENTATION METHOD IN A HOST PLATFORM LAYER, DEVICE, AND MEDIUM

(71) Applicant: BEIJING BAIDU NETCOM SCIENCE AND TECHNOLOGY CO., LTD., Beijing (CN)

(72) Inventors: Rui Dong, Beijing (CN); Wei Sun, Beijing (CN); Zhixing Lei, Beijing (CN); Jia Li, Beijing (CN); Du Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/280,113

(22) PCT Filed: Jul. 15, 2020

(86) PCT No.: PCT/CN2020/101984
§ 371 (c)(1),
(2) Date: Mar. 25, 2021

(87) PCT Pub. No.: WO2021/169150
PCT Pub. Date: Sep. 2, 2021

(65) Prior Publication Data
US 2022/0114036 A1  Apr. 14, 2022

(30) Foreign Application Priority Data
Feb. 28, 2020 (CN) .................... 202010130237.7

(51) Int. Cl.
*G06F 3/12* (2006.01)
*G06F 9/54* (2006.01)
*G06F 9/445* (2018.01)

(52) U.S. Cl.
CPC .......... *G06F 9/545* (2013.01); *G06F 9/44505* (2013.01)

(58) Field of Classification Search
CPC ..................... G06F 9/545; G06F 9/44505
See application file for complete search history.

(56) References Cited

U.S. PATENT DOCUMENTS 7,899,451 B2 * 3/2011 Hu ................. H04W 48/17
370/332
8,640,093 B1  1/2014 Gill et al.
(Continued)

FOREIGN PATENT DOCUMENTS

CN  104301443 A  1/2015
CN  104572278 A  4/2015
(Continued)

OTHER PUBLICATIONS

Extended European Search Report, from the European Patent Office, issued to EP Application No. 20864288.4-1203 dated Dec. 23, 2021, 11 pages.
(Continued)

*Primary Examiner* — Andy Ho
*Assistant Examiner* — Abdou K Seye
(74) *Attorney, Agent, or Firm* — Hunton Andrews Kurth LLP

(57) ABSTRACT

Provided are an application interface implementation method and apparatus in a host platform layer, a device, and a storage medium, which relate to the field of computer technologies. The implementation scheme includes: the host platform layer acquiring description data of a terminal capability interface; parsing the description data to acquire a communication mode of the terminal capability interface; and configuring a corresponding processor according to the communication mode, configuring a corresponding concept
(Continued)

mapping relationship according to the communication mode, or configure a corresponding processor and a corresponding concept mapping relationship according to the communication mode to encapsulate a platform layer interface of the terminal capability interface, where the platform layer interface is configured to process data of communication interactions in a process in which a mini program calls the terminal capability interface through the host platform layer.

18 Claims, 6 Drawing Sheets

(56) References Cited

U.S. PATENT DOCUMENTS

| | | | | |
|---|---|---|---|---|
| 10,296,309 | B1* | 5/2019 | Mercille | G06F 8/30 |
| 2005/0159123 | A1* | 7/2005 | Lu | G06F 15/8015 |
| | | | | 455/183.2 |
| 2009/0172710 | A1 | 7/2009 | Toorians et al. | |
| 2011/0022198 | A1* | 1/2011 | Plache | G05B 19/41845 |
| | | | | 700/86 |
| 2012/0096096 | A1 | 4/2012 | Jang et al. | |
| 2013/0219415 | A1 | 8/2013 | Jeon et al. | |
| 2015/0356157 | A1 | 12/2015 | Anderson et al. | |
| 2016/0077901 | A1* | 3/2016 | Roth | H04L 67/1097 |
| | | | | 719/328 |
| 2018/0343318 | A1* | 11/2018 | Yuan | H04L 67/306 |

FOREIGN PATENT DOCUMENTS

| | | |
|---|---|---|
| CN | 104883384 A | 9/2015 |
| CN | 109062626 A | 12/2018 |
| CN | 109976831 A | 7/2019 |
| CN | 111367635 A | 7/2020 |
| KR | 20120038181 A | 4/2012 |

OTHER PUBLICATIONS

First Chinese Search Report, from the Chinese Patent Office, issued to CN Application No. 202010130237.7, dated Dec. 22, 2021, 5 pages.

First Chinese Office Action, from the Chinese Patent Office, issued to CN Application No. 202010130237.7, dated Dec. 21, 2021, 11 pages.

International Search Report issued from the International Search Authority to Application No. PCT/CN2020/101984 dated Dec. 2, 2020, 5 pages.

Chinese Office Action, The State Intellectual Property Office of People's Republic of China, dated CN Application No. 202010130237.7 dated Sep. 5, 2022, 14 pages.

European Search Report issued from the European Patent Office to EP Application No. 20864288.4 dated Aug. 31, 2022, 9 pages.

Supplemental Chinese Search Report, from The State Intellectual Property Office of People's Republic of China, issued to CN Application No. 202010130237.7, dated Aug. 30, 2022, 4 pages.

Korean Office Action, Korean Intellectual Property Office of People's Republic of China, issued to KR Application No. 10-2021-7009337 dated Oct. 24, 2022, 13 pages.

* cited by examiner

APPLICATION INTERFACE IMPLEMENTATION METHOD IN A HOST PLATFORM LAYER, DEVICE, AND MEDIUM

CROSS-REFERENCE TO RELATED APPLICATIONS

This is a National Stage Application, filed under 35 U.S.C. § 371, of International Patent Application No. PCT/CN2020/101984, filed on Jul. 15, 2020, which claims priority to Chinese Patent Application No. 202010130237.7 filed with the China National Intellectual Property Administration on Feb. 28, 2020, the disclosures of which are incorporated herein by reference in their entireties.

TECHNICAL FIELD

The present application relates to the field of computer technologies, for example, a computer mini program technology.

BACKGROUND

A mini program is a technical form in which a native program (NA) and Web are fused. The mini program generally runs on a host program as its platform. The host program is generally common application (APP) software and runs in an operating system environment of a terminal.

The host program is generally implemented through JavaScript and may also be referred to as a JS layer, that is, a host platform layer. In a running process of the mini program, software and hardware capabilities, also referred to as a terminal capability, of a terminal where the mini program is located need to be called through the JS layer. The terminal capability of the terminal is implemented by the native program. The JS platform exposes an application programming interface (API) through which the terminal capability of the NA is called to the mini program for the mini program to call the terminal capability when the mini program runs.

However, the current issue is that when the mini program calls the terminal capability of the NA through the JS layer, the communication between the JS layer and the API for the terminal capability of the NA is involved. A communication mode of the API varies with terminal hardware, the version of an operating system, and the like. As a result, the JS layer needs to frequently maintain the codes of each kind of API in large amounts, so as to ensure that the mini program can properly call the terminal capability.

SUMMARY

The following is a summary of the subject matter described herein in detail. The summary is not intended to limit the scope of the claims.

The present application discloses an application interface implementation method and apparatus in a host platform layer, a device, and a medium, so as to optimize an interface maintenance method in the host platform layer and reduce maintenance costs.

In an embodiment, the present application provides an application interface implementation method in a host platform layer. The method is executed by the host platform layer and includes steps described below.

Description data of a terminal capability interface is acquired.

The description data is parsed so that a communication mode of the terminal capability interface is acquired.

A corresponding processor is configured according to the communication mode, or a corresponding concept mapping relationship is configured according to the communication mode, or a corresponding processor and a corresponding concept mapping relationship are configured according to the communication mode so that a platform layer interface of the terminal capability interface is encapsulated and formed. The platform layer interface is configured to process data of communication interactions in a process of a mini program calling the terminal capability interface through the host platform layer.

The preceding embodiment of the present application has the following advantages or beneficial effects: the host platform layer may acquire the communication mode of the terminal capability interface by parsing the description data of the terminal capability interface provided by an NA layer and configure the processor according to the communication mode, configure the corresponding concept mapping relationship according to the communication mode, or configure the corresponding processor and concept mapping relationship according to the communication mode so that the platform layer interface of the terminal capability interface can be automatically generated, thereby avoiding the frequent maintenance of codes of the platform layer interface in large amounts due to a difference between terminal hardware, versions of operating systems, or the like and reducing manual maintenance costs of the platform layer interface. Moreover, the NA layer only needs to pay attention to the generation of the description data and the host platform layer only needs to encapsulate the platform layer interface according to the description data so that the NA layer and the host platform layer have clear functions, avoiding a blurred boundary between functions. In addition, the NA layer may be constrained to generate uniform and standard description data to some extent, avoiding confusing management of the NA layer.

In an embodiment, the step in which the corresponding concept mapping relationship is configured according to the communication mode includes steps described below.

In response to a name of a current host platform layer existing within a host scenario range declared in the communication mode, a mapping relationship between a name of the terminal capability interface and a host scenario name is established, and an interface parameter of the terminal capability interface corresponding to the current host platform layer is determined.

The preceding embodiment of the present application has the following advantages or beneficial effects: in the case where the name of the host platform layer exists in the host scenario range declared in the communication mode, a mapping relationship between names and parameters of the terminal capability interface and a host platform layer interface is flexibly configured, so as to adapt to the configuration of concept mapping relationships in different host environments.

In an embodiment, the processor has a type including at least one of a parameter type check processor, a parameter serialization processor, a return value deserialization processor, a set rule encoder, a set rule decoder, a parameter calculator, a filter, a parser, a parameter splicer, a callback function processor, or a calling mode processor.

The preceding embodiment of the present application has the following advantages or beneficial effects: the host platform layer defines different types of processors, so as to implement corresponding processing on different call requests of the mini program and different call results fed back by the terminal capability interface and call back a processed call result in different manners.

In an embodiment, the processor involves a calling stage including at least one of pre-call processing, local callback function processing, remote callback function processing, or developer callback function processing.

The preceding embodiment of the present application has the following advantages or beneficial effects: at a stage before the terminal capability interface is called, a stage at which a call result fed back by a local/remote terminal capability interface is called back, and a stage at which a call result is fed back to the mini program, the host platform layer may perform processing on a call request and a call result separately through the processor and call back the processed call result in different manners.

In an embodiment, the step in which the corresponding concept mapping relationship is configured according to the communication mode includes a step described below.

A mapping relationship with a name, incoming parameter, and outgoing parameter of the platform layer interface is established according to a name, incoming parameter, and outgoing parameter of the terminal capability interface that are declared in the communication mode.

The preceding embodiment of the present application has the following advantages or beneficial effects: the host platform layer establishes a mapping relationship between the name of the terminal capability interface and the name of the platform layer interface, a mapping relationship between the incoming parameter of the terminal capability interface and the incoming parameter of the platform layer interface, and a mapping relationship between the outgoing parameter of the terminal capability interface and the outgoing parameter of the platform layer interface, thereby implementing flexible mapping between names and parameters of the terminal capability interface and the platform layer interface.

In an embodiment, the step in which the corresponding concept mapping relationship is configured according to the communication mode includes a step described below.

A relationship with a communication call function of the platform layer interface is established according to a communication bridge or a communication function of a terminal capability that is declared in the communication mode.

The preceding embodiment of the present application has the following advantages or beneficial effects: the host platform layer establishes the relationship between the communication bridge or the communication function of the terminal capability and the communication call function of the platform layer interface, thereby implementing communications between the terminal capability interface and the host platform layer.

In an embodiment, the step in which the corresponding concept mapping relationship is configured according to the communication mode includes a step described below.

A mapping relationship with a processor name provided by the host platform layer is established according to a processor name declared in the communication mode.

The preceding embodiment of the present application has the following advantages or beneficial effects: the host platform layer establishes a mapping relationship between the declared processor name and at least one processor name provided by the host platform layer and can search for the corresponding processor according to the at least one processor name, which is conducive for the host platform layer to flexibly combine a series of processors according to the declared processor name.

In an embodiment, the step in which the corresponding processor is configured according to the communication mode includes steps described below.

A corresponding general-purpose processor is queried from a predefined processor library according to a processor function declared in the communication mode.

The general-purpose processor is changed according to the processor function declared in the communication mode so that a configured extended processor is formed.

The preceding embodiment of the present application has the following advantages or beneficial effects: the host platform layer searches for and changes the general-purpose processor according to the declared processor function, so as to process the call request and the call result and call back the processed call result in different manners according to the searched and changed processor.

In an embodiment, the step in which the description data of the terminal capability interface is acquired includes steps described below.

A description file into which description data of multiple terminal capability interfaces is integrated is acquired and parsed so that the description data is acquired.

The preceding embodiment of the present application has the following advantages or beneficial effects: the NA layer integrates description data of multiple terminal capabilities into a description file so that the host platform layer can acquire the description data of multiple terminal capability interfaces in batches, which facilitates automatic generation of multiple platform layer interfaces at the same time.

In an embodiment, the step in which the description data of the terminal capability interface is acquired includes a step described below.

The actively reported description data of the terminal capability interface is received.

Alternatively, an update of the description data of the terminal capability interface is requested before or during initial running of the mini program.

The preceding embodiment of the present application has the following advantages or beneficial effects: the NA layer may actively report or passively report as requested the description data of the terminal capability interface to the host platform layer. Therefore, when a communication mode between the NA layer and the host platform layer changes, the host platform layer does not need to modify codes of the platform layer interface and simply automatically generates the platform layer interface again according to updated description data, which helps the platform layer interface automatically adapt to a change of the communication mode.

In an embodiment, the present application provides a host platform-based mini program running method. The method is executed by a host platform layer and includes steps described below.

A call request for a platform layer interface is acquired from a mini program running in the host platform layer, where the platform layer interface is encapsulated and formed by the interface implementation method in the host platform layer according to any one of the above-mentioned embodiments.

The call request is processed according to a processor of the platform layer interface, or according to a concept mapping relationship of the platform layer interface, or according to a processor and a concept mapping relationship of the platform layer interface.

A terminal capability interface corresponding to the platform layer interface is called according to the processed call request.

A call result fed back by the terminal capability interface is acquired.

The call result is processed according to the processor of the platform layer interface, or according to the concept mapping relationship of the platform layer interface, or according to the processor and the concept mapping relationship of the platform layer interface, and the processed call result is fed back to the mini program.

In an embodiment, the present application provides an application interface implementation apparatus in a host platform layer. The apparatus is integrated into the host platform layer and includes a description data acquisition module, a communication mode parsing module, and a platform layer interface generation module.

The description data acquisition module is configured to acquire description data of a terminal capability interface.

The communication mode parsing module is configured to parse the description data to acquire a communication mode of the terminal capability interface.

The platform layer interface generation module is configured to configure a corresponding processor according to the communication mode, or configure a corresponding concept mapping relationship according to the communication mode, or configure a corresponding processor and a corresponding concept mapping relationship according to the communication mode to encapsulate and form a platform layer interface of the terminal capability interface. The platform layer interface is configured to process data of communication interactions in a process of a mini program calling the terminal capability interface through the host platform layer.

In an embodiment, the present application provides a host platform-based mini program running apparatus. The apparatus is integrated into a host platform layer and includes a call request acquisition module, a call request processing module, a terminal capability interface calling module, a call result acquisition module, and a call result feedback module.

The call request acquisition module is configured to acquire a call request for a platform layer interface from a mini program running in the host platform layer, where the platform layer interface is encapsulated and formed by the application interface implementation method in the host platform layer according to any embodiment of the present application.

The call request processing module is configured to process the call request according to a processor of the platform layer interface, or according to a concept mapping relationship of the platform layer interface, or according to a processor and a concept mapping relationship of the platform layer interface.

The terminal capability interface calling module is configured to call a terminal capability interface corresponding to the platform layer interface according to the processed call request.

The call result acquisition module is configured to acquire a call result fed back by the terminal capability interface.

The call result feedback module is configured to process the call result according to the processor of the platform layer interface, or according to the concept mapping relationship of the platform layer interface, or according to the processor and the concept mapping relationship of the platform layer interface, and feed back the processed call result to the mini program.

In a fifth aspect, an embodiment of the present application provides an electronic device. The electronic device includes at least one processor and a memory communicatively connected to the at least one processor.

The memory stores instructions executable by the at least one processor, where the instructions are executed by the at least one processor to cause the at least one processor to execute the application interface implementation method in the host platform layer or the host platform-based mini program running method according to any embodiment of the present application.

In an embodiment, the present application provides a non-transitory computer-readable storage medium. The non-transitory computer-readable storage medium stores computer instructions for causing a computer to execute the application interface implementation method in the host platform layer or the host platform-based mini program running method according to any embodiment of the present application.

The preceding embodiments of the present application have the following advantages or beneficial effects: the host platform layer may acquire the communication mode of the terminal capability interface by parsing the description data of the terminal capability interface provided by the NA layer and configure the processor according to the communication mode, or configure the concept mapping relationship according to the communication mode, or configure the processor and the concept mapping relationship according to the communication mode so that the platform layer interface of the terminal capability interface can be automatically generated, thereby avoiding the frequent maintenance of the codes of the platform layer interface in large amounts due to the difference of the terminal hardware, versions of the operating system, or the like and reducing the manual maintenance costs of the platform layer interface. Moreover, the NA layer only needs to pay attention to the generation of the description data and the host platform layer only needs to encapsulate the platform layer interface according to the description data so that the NA layer and the host platform layer have clear functions, avoiding a blurred boundary between functions. In addition, the NA layer may be constrained to generate uniform and standard description data to some extent, avoiding the confusing management of the NA layer.

Other effects of the preceding alternative implementations are described hereinafter in connection with embodiments.

Other aspects can be understood after the drawings and the detailed description are read and understood.

BRIEF DESCRIPTION OF DRAWINGS

The drawings are intended to provide a better understanding of the present scheme and not to limit the present application.

DETAILED DESCRIPTION

Example embodiments of the present application, including details of embodiments of the present application, are described hereinafter in connection with the drawings to facilitate understanding. The example embodiments are illustrative only. Therefore, it will be appreciated by those having ordinary skill in the art that various changes and modifications may be made to the embodiments described herein without departing from the scope and spirit of the present application. Similarly, the description of well-known functions and constructions is omitted hereinafter for clarity and conciseness.

First Embodiment

Figure 1:
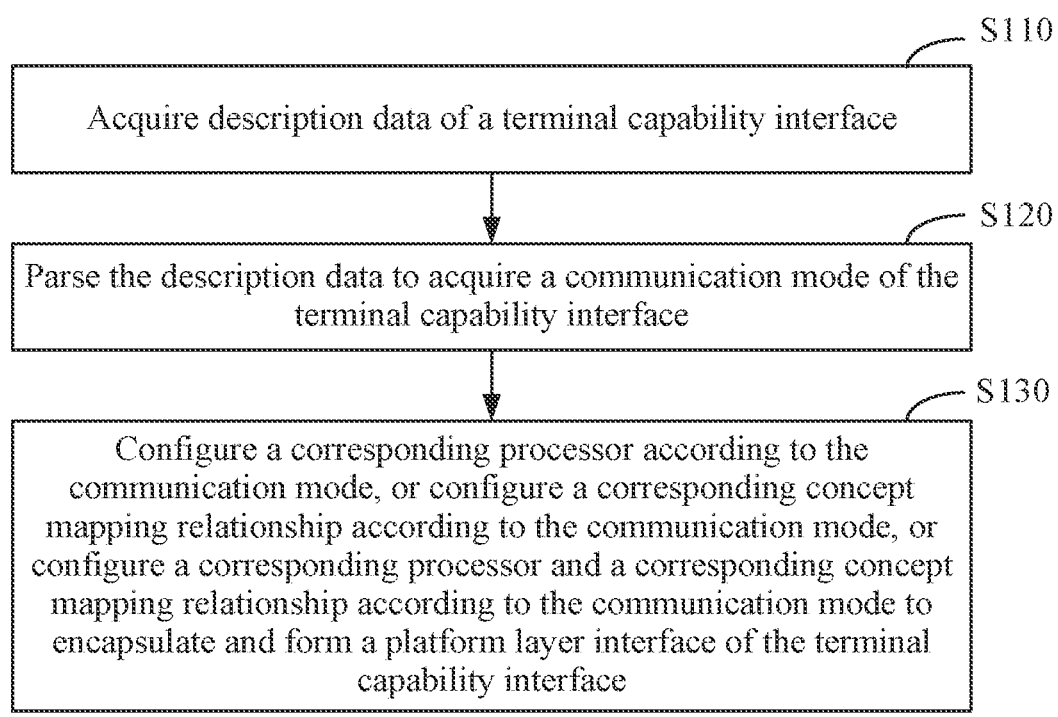
FIG. 1 is a flowchart of an application interface implementation method in a host platform layer according to a first embodiment of the present application.

FIG. 1 is a flowchart of an application interface implementation method in a host platform layer according to the first embodiment of the present application. This embodiment is applicable to a case where a platform layer interface is generated in the host platform layer so that a mini program calls a terminal capability interface by calling the platform layer interface. The method may be executed by an application interface implementation apparatus in the host platform layer. The apparatus is implemented by software, hardware, or a combination of software and hardware and preferably configured in an electronic device such as a smartphone, a smartwatch, a tablet computer, or a notebook computer. As shown in FIG. 1, the method is executed by the host platform layer and, for example, includes steps described below.

In S110, description data of the terminal capability interface is acquired.

In an embodiment of the present application, an application programming interface of a terminal capability may be simply referred to as the terminal capability interface. The NA layer may pre-generate the description data of the terminal capability interface and report the description data to the host platform layer. The description data of the terminal capability interface is configured to describe a communication mode in a process of calling the terminal capability through the terminal capability interface. The description of the communication mode may include at least one of a name (Name), an incoming parameter, an outgoing parameter, and array types thereof (Args), a communication bridge or a communication function (Method), or a processor name (Invoke) of the terminal capability interface.

Due to the diversity of host platform layers, the terminal capability interface may have different names when called by different host platform layers. The Name field may be configured to declare names of the terminal capability interface when it is called in different host scenarios. Exemplarily, when a terminal capability interface 1 is called by a mini program installed in application software A (that is, the host platform layer is A), the name of the interface may be A.XX, and when the terminal capability interface 1 is called by a mini program installed in application software B, the name of the interface may be B.XX. A terminal manufacturer may reach a consensus with each software application developer in advance on the name of the terminal capability interface in the software application of the terminal manufacturer, and the NA layer may add a negotiated name of the interface to the Name field. The NA layer may also add a general name of the interface to Name so that an un-negotiated host platform layer can call the terminal capability interface.

The Args field may be configured to declare the incoming parameter and the outgoing parameter of the terminal capability interface and the array types of the incoming parameter and the outgoing parameter. The Method field may be configured to declare the communication bridge or the communication function which is actually called when the terminal capability interface is called to implement communications.

Since a parameter carried in a call request of the mini program and a callback parameter required by the mini program are somewhat different from the incoming parameter and the outgoing parameter of the terminal capability interface, some processing operations need to be performed on the call request or the outgoing parameter in the host platform layer, so as to successfully call the terminal capability interface. Exemplarily, the mini program calls a certain terminal capability through the host platform layer, and a parameter transmitted by the mini program to the host platform layer is a character string with a natural semantic meaning. However, the terminal capability interface cannot recognize the format of the character string. Therefore, a series of processing needs to be performed on the transmitted character string, for example, conversion of a parameter type (for example, converting the character string into digits) and serialization (for example, converting several numbers into an array). The specific processing on the parameter inputted by the mini program may be performed through a series of processors in the host platform layer.

The Invoke field may be configured to declare a processor name required in a process of calling the terminal capability interface. The processor name may be mapped to at least one processor name in the host platform layer, and a processor corresponding to the at least one processor name may be configured to process the incoming parameter and the outgoing parameter and may be further configured to call back the processed outgoing parameter in different manners. Exemplarily, when the Invoke field is a character string method.json, the host platform layer maps the character string to a series of processor names ['arg check', 'decode', ' . . . ']. 'Arg check' is a name of a parameter type check processor and 'decode' is a name of a decoder.

In S120, the description data is parsed so that the communication mode of the terminal capability interface is acquired.

In an embodiment of the present application, the host platform layer parses the received description data to acquire the communication mode of the terminal capability interface. The communication mode may be, for example, at least one of the name (Name), the incoming parameter, the outgoing parameter, and the array types thereof (Args), the communication bridge or the communication function (Method), or the processor name (Invoke) of the terminal capability interface.

In S130, a corresponding processor is configured according to the communication mode, or a corresponding concept mapping relationship is configured according to the communication mode, or a corresponding processor and a corresponding concept mapping relationship are configured according to the communication mode so that a platform layer interface of the terminal capability interface is encapsulated and formed.

In an embodiment of the present application, the host platform layer may configure a mapping relationship of at least one concept of the name of the interface, the incoming parameter, the outgoing parameter, and the array types thereof, the communication bridge or the communication function, or the processor name according to at least one field of Name, Args, Method, or Invoke in the communication mode and may configure the processor according to the processor name obtained by mapping the Invoke field.

For example, when the name of the terminal capability interface is the same as a name of the platform layer interface, other concepts do not need to be mapped, and only the corresponding processor needs to be configured to process the call request or a call result, or call back the call result in different manners so that when the terminal capability interface is called, the host platform layer may configure only the corresponding processor to encapsulate and form the platform layer interface of the terminal capability interface. When the call request or the call result does not need to be processed or the call result does not need to be called back in a special manner and only the corresponding concept mapping relationship needs to be configured so that the terminal capability interface may be called, the host platform layer may configure only the corresponding concept mapping relationship to encapsulate and form the platform layer interface of the terminal capability interface. When not only the corresponding processor needs to be configured to process the call request or the call result or call back the call result in different manners but also the corresponding concept mapping relationship needs to be configured so that the terminal capability interface may be called, the host platform layer may configure the corresponding processor and concept mapping relationship to encapsulate and form the platform layer interface of the terminal capability interface. The platform layer interface generated by the host platform layer may be configured to process data of communication interactions in a process of the mini program calling the terminal capability interface through the host platform layer.

In this embodiment, the processor has a type including at least one of the parameter type check processor, a parameter serialization processor, a return value deserialization processor, a set rule encoder, a set rule decoder, a parameter calculator, a filter, a parser, a parameter splicer, a callback function processor, or a calling mode processor.

Generally, the parameter type check processor, the parameter serialization processor, the set rule encoder, and the parameter calculator may be configured to process the parameter carried in the call request. The return value deserialization processor and the set rule decoder may be configured to process the call result fed back by the terminal capability interface. The filter, the parser, and the parameter splicer may process the call request and the call result. The callback function processor may call back the call result, where a callback function is, for example, a local callback function, a remote callback function, and a developer callback function. The calling mode processor may implement call operations in different manners, where a calling mode is, for example, a prompt mode, a location.href mode, or an iframe mode. The preceding processors may be configured to process the call request, or the call result, or the call request and the call result according to an actual call scenario of the terminal capability interface, but it is not limited to the preceding application stage. The host platform layer defines different types of processors, so as to implement corresponding processing on different call requests of the mini program and different call results fed back by the terminal capability interface and call back the processed call result in different manners.

In this embodiment, the processor involves a calling stage including at least one of pre-call processing, local callback function processing, remote callback function processing, or developer callback function processing.

For example, in a calling stage before the terminal capability interface is called, the processor may process the call request. In callback stages of the local callback function processing, the remote callback function processing, and the developer callback function processing, the processor may process the call result and call back the processed call result in different manners.

In an embodiment, the local callback function may refer to a callback function loaded in the host platform layer and executed by the NA layer, and the local callback function may call back a result processed by the NA layer to the host platform layer. The remote callback function may refer to a callback function provided by the host platform layer and executed by the NA layer when the NA layer performs some asynchronous operations (for example, calling a remote terminal capability interface), and the remote callback function may call back the result processed by the NA layer to the host platform layer. The developer callback function may refer to a callback function provided by a developer and executed by a JS layer, and the developer callback function may process the result returned by the NA layer into a result required by the mini program and then call back the result to the developer. At the stage before the terminal capability interface is called, a stage at which a call result fed back by a local/remote terminal capability interface is called back, and a stage at which the call result is fed back to the mini program, the host platform layer may implement the processing on the call request and the call result separately through the processors and call back the processed call result in different manners.

In this embodiment, the step in which the description data of the terminal capability interface is acquired may include acquiring a description file into which description data of multiple terminal capability interfaces is integrated, and parsing the description file to acquire the description data.

For example, the NA layer may generate one piece of description data for each terminal capability interface and integrate description data of multiple terminal capability interfaces into the description file (for example, a JSON object). The host platform layer acquires the description data of multiple terminal capability interfaces in batches, which facilitates the automatic generation of multiple platform layer interfaces at the same time.

In this embodiment, the step in which the description data of the terminal capability interface is acquired may include receiving the actively reported description data of the terminal capability interface; or requesting an update of the description data of the terminal capability interface before or during initial running of the mini program.

For example, when terminal hardware, a version of the operating system, a version of the host platform, or the like is changed, the NA layer may actively report the description data of the terminal capability interface to the host platform layer. Alternatively, before or during the initial running of the mini program, a request for the description data may be initiated to the NA layer through the host platform layer, and the NA layer may passively report the description data of the terminal capability interface to the host platform layer according to the request. Therefore, when the communication mode between the NA layer and the host platform layer changes, the host platform layer does not need to modify codes of the platform layer interface and simply automatically re-generates the platform layer interface according to the updated description data, which helps the platform layer interface automatically adapt to the change of the communication mode.

According to the technical scheme in this embodiment, the host platform layer may acquire the communication mode of the terminal capability interface by parsing the description data of the terminal capability interface provided by the NA layer, and the host platform layer configures the processor according to the communication mode, or configures the concept mapping relationship according to the communication mode, or configures the processor and the concept mapping relationship according to the communication mode so that the platform layer interface of the terminal capability interface can be automatically generated, thereby avoiding the frequent maintenance of the codes of the platform layer interface in large amounts due to a difference of the terminal hardware, versions of the operating system, or the like and reducing manual maintenance costs of the platform layer interface. Meanwhile, the NA layer only needs to pay attention to the generation of the description data and the host platform layer only needs to encapsulate the platform layer interface according to the description data so that the NA layer and the host platform layer have clear functions, avoiding a blurred boundary between functions. Moreover, since the NA layer needs to generate the description data, the NA layer may be constrained to generate uniform and standard description data to some extent. For example, the name of the terminal capability interface is unified and standardized, avoiding confusing management of the NA layer. In addition, the platform layer interface automatically generated by the host platform layer according to the description data may have forward compatibility, that is, the automatically generated platform layer interface may coexist with an existing platform layer interface that is manually encoded, improving user experience.

Second Embodiment

Figure 2:
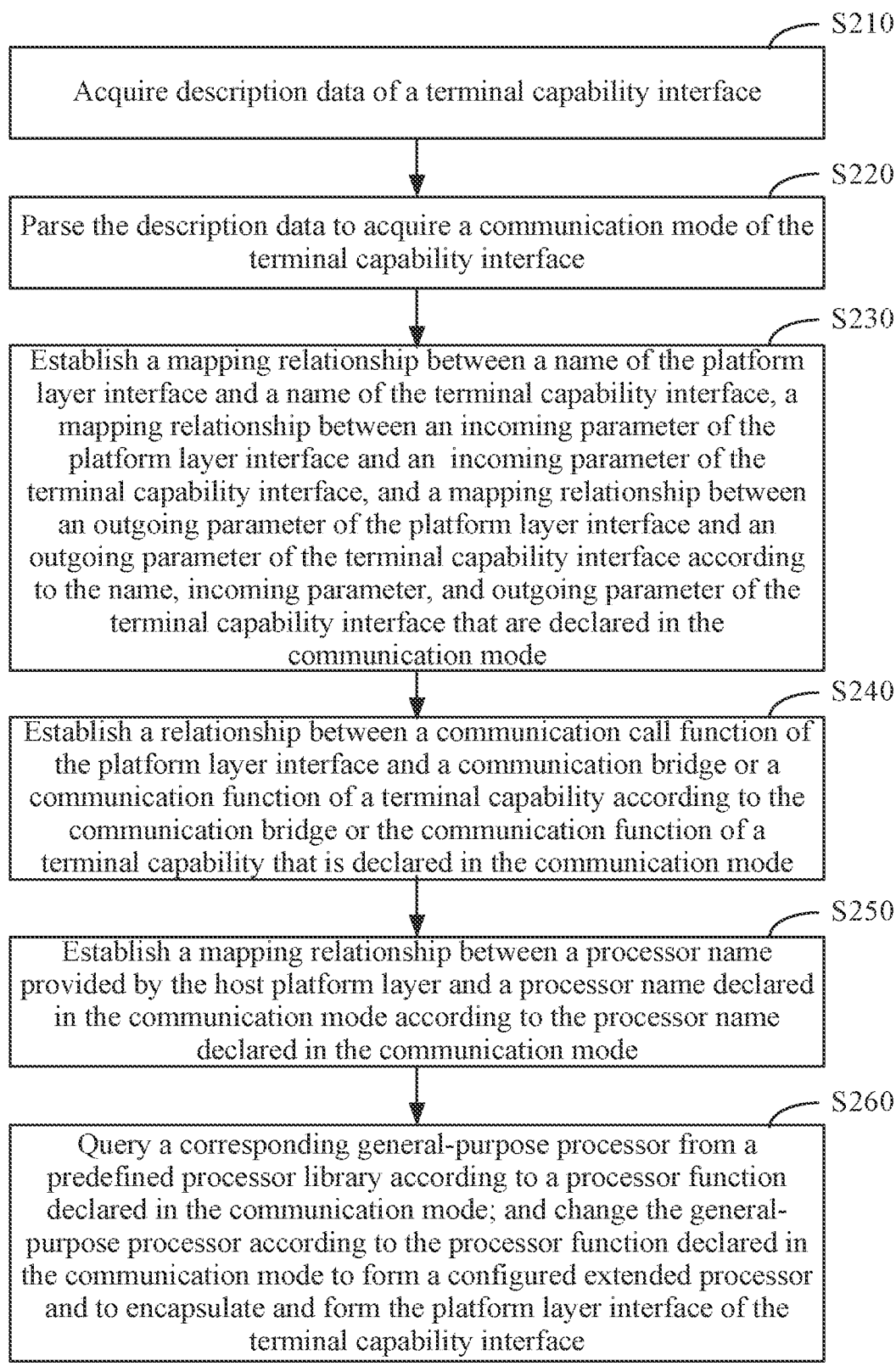
FIG. 2 is a flowchart of an application interface implementation method in a host platform layer according to a second embodiment of the present application.

FIG. 2 is a flowchart of an application interface implementation method in a host platform layer according to a second embodiment of the present application. Based on the preceding embodiment, this embodiment illustrates that the host platform layer configures a corresponding processor and a corresponding concept mapping relationship according to a communication mode, a concept mapping relationship about an interface name, an incoming parameter, an outgoing parameter, and array types thereof, a communication bridge or a communication function, and a processor name between the terminal capability interface and the platform layer interface can be configured and a processor can be configured according to the processor name. Same technical details between this embodiment and the preceding embodiment are not repeated here. As shown in FIG. 2, the method is executed by the host platform layer and, for example, includes steps described below.

In S210, description data of the terminal capability interface is acquired.

In S220, the description data is parsed so that the communication mode of the terminal capability interface is acquired.

In S230, a mapping relationship between a name of the platform layer interface and a name of the terminal capability interface, a mapping relationship between an incoming parameter of the platform layer interface and an incoming parameter of the terminal capability interface, and a mapping relationship between an outgoing parameter of the platform layer interface and an outgoing parameter of the terminal capability interface are established according to the name, incoming parameter, and outgoing parameter of the terminal capability interface that are declared in the communication mode.

In an embodiment of the present application, in the case where the name of the terminal capability interface and the name of the platform layer interface maintained by the host platform layer are different but correspond to the same terminal capability interface, the host platform layer may establish a mapping relationship between the name of the terminal capability interface and the name of the platform layer interface. For example, when the name of the terminal capability interface does not intuitively reflect the terminal capability, to make it easy for a mini program developer to understand, the host platform layer may establish the mapping relationship between the name of the terminal capability interface and the name of the platform layer interface that is easy to understand. When the host platform layer receives a request for calling the platform layer interface, the corresponding terminal capability interface may be called according to the mapping relationship between the name of the terminal capability interface and the name of the platform layer interface.

Moreover, the incoming parameter and the outgoing parameter of the terminal capability interface may be different from a parameter in a call request of the mini program received by the platform layer interface and a parameter fed back to the mini program. In addition, when the incoming parameter and the outgoing parameter are in an array form, types of an incoming array and an outgoing array may be different from an array type in the call request of the mini program received by the platform layer interface and an array type fed back to the mini program. In these cases, the host platform layer needs to perform a series of processing operations to convert the parameter and the array type thereof in the call request of the mini program into the incoming parameter and the array type thereof of the terminal capability interface and convert the outgoing parameter and the array type thereof of the terminal capability interface into the parameter and the array type thereof that are fed back to the mini program. In this case, the host platform layer may establish a mapping relationship between the incoming parameter and the outgoing parameter of the terminal capability interface and the incoming parameter and the outgoing parameter of the platform interface, so as to perform corresponding data processing.

The host platform layer establishes the mapping relationship between the name of the terminal capability interface and the name of the platform layer interface, the mapping relationship between the incoming parameter of the terminal capability interface and the incoming parameter of the platform layer interface, and the mapping relationship between the outgoing parameter of the terminal capability interface and the outgoing parameter of the platform layer interface, thereby implementing flexible mapping between names and parameters of the terminal capability interface and the platform layer interface.

In S240, a relationship between a communication call function of the platform layer interface and one of a communication bridge of the terminal capability or a communication function of the terminal capability is established according to the communication bridge or the communication function of the terminal capability that is declared in the communication mode.

In an embodiment of the present application, JSBridge may implement the communications between Native codes and JS codes. For example, an implementation process of JSBridge may include as follows: a global bridge object for interactions between NA and JS is designed; JS calls NA through a communication function (for example, callHandler) of the global bridge object; and NA processes the call and performs callback by calling a JS method of H5 through JSBridge.

Therefore, to implement the communications between the terminal capability interface and the host platform layer, the host platform layer may establish the relationship between the communication bridge or the communication function of the terminal capability and the communication call function of the platform layer interface.

In S250, a mapping relationship between a processor name provided by the host platform layer and a processor name declared in the communication mode is established according to the processor name declared in the communication mode.

In an embodiment of the present application, the Invoke field, the processor name, declared in the communication mode is a character string, and the character string does not indicate names of some specific processors but may establish the mapping relationship with, for example, the processor name provided by the host platform layer. For example, the host platform layer may predefine an array of processor names of each series and establish a mapping relationship between each array and the declared processor name, so as to establish a mapping relationship between the declared processor name and at least one processor name provided by the host platform layer, which is conducive for the host platform layer to flexibly combine a series of processors according to the declared processor name. Therefore, the host platform layer may search for the corresponding processor according to the at least one processor name to implement a series of required processing on the call request and callback result, and a callback mode required by the call result.

In S260, a corresponding general-purpose processor is queried from a predefined processor library according to a processor function declared in the communication mode; and the general-purpose processor is changed according to the processor function declared in the communication mode so that a configured extended processor is formed and the platform layer interface of the terminal capability interface is encapsulated.

In an embodiment of the present application, the declared processor function may be considered as a series of required processing on the call request and the callback result and the callback mode required by the call result, and the series of required processing corresponds to the processor name, the Invoke field. According to the required series of processing and callback mode, the corresponding general-purpose processor may be queried from the predefined processor library, and when the general-purpose processor does not meet the requirements, the existing processor may be extended and changed. For example, a processor with a special function is extended or the existing processor is changed to form an extended processor satisfying a specificity requirement. The host platform layer searches for and changes the general-purpose processor according to the declared processor function, so as to process the call request and the call result and call back the processed call result in different manners according to the searched and changed processor.

In this embodiment, in response to a name of a current host platform layer existing within a host scenario range declared in the communication mode, a mapping relationship between the name of the terminal capability interface and the host scenario name is established, and an interface parameter of the terminal capability interface corresponding to the current host platform layer is determined.

For example, if names of the terminal capability interface in different host scenarios have been declared in the communication mode, the mapping relationship between the name of the terminal capability interface and the host scenario name corresponding to the current host platform layer may be directly established. Exemplarily, the host scenario range declared in the communication mode of a terminal capability interface 1 includes application software A and application software B, the interface name of the terminal capability interface 1 is A.XX (when the terminal capability interface is called by application software A, and the interface name of the terminal capability interface 1 is B.XX (when the terminal capability interface is called by application software B. If the name of the current host platform layer is application software A, a mapping relationship between the terminal capability interface 1 and A.XX (may be established. In an embodiment, when the host platform layer customizes a name of the platform interface that is easy to understand, a relationship between the host scenario name and the platform interface name may also be established. For example, the host platform layer may establish a mapping relationship between the host scenario name A.XX (and a customized name xx of the interface.

For example, determining the interface parameter of the terminal capability interface corresponding to the current host platform layer may be considered as being equivalent to establishing the mapping relationship between the incoming parameter and the outgoing parameter of the terminal capability interface and the incoming parameter and the outgoing parameter of the platform layer interface. In the case where the name of the host platform layer exists in the host scenario range declared in the communication mode, the mapping relationship between names and parameters of the terminal capability interface and a host platform layer interface is flexibly configured, so as to adapt to the configuration of concept mapping relationships in different host environments.

According to the technical scheme in this embodiment, the host platform layer establishes the mapping relationship between the name of the terminal capability interface and the name of the platform layer interface, the mapping relationship between the incoming parameter of the terminal capability interface and the incoming parameter of the platform layer interface, and the mapping relationship between the outgoing parameter of the terminal capability interface and the outgoing parameter of the platform layer interface, thereby implementing the flexible mapping between names and parameters of the terminal capability interface and the platform layer interface. The host platform layer establishes the relationship between the communication bridge or the communication function of the terminal capability and the communication call function of the platform layer interface, thereby implementing the communications between the terminal capability interface and the host platform layer. The host platform layer establishes the mapping relationship between the declared processor name and at least one processor name provided by the host platform layer and may search for the corresponding processor according to the at least one processor name, which is conducive for the host platform layer to flexibly combine a series of processors according to the declared processor name. The host platform layer searches for and changes the general-purpose processor according to the declared processor function, which facilitates the processing on the call request and the call result and callback of the processed call result in different manners according to the searched and changed processor.

Third Embodiment

Figure 3A:
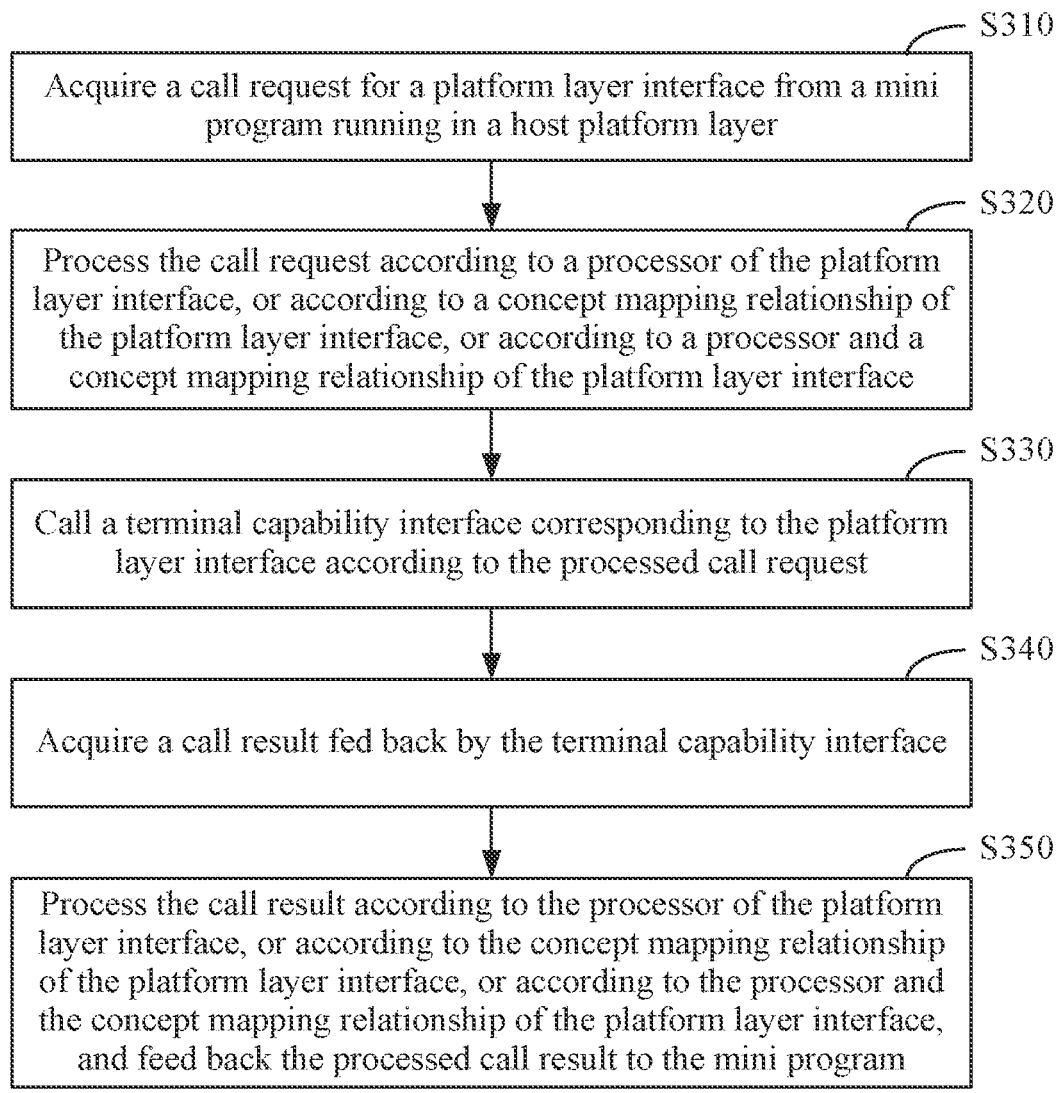
FIG. 3A is a flowchart of a host platform-based mini program running method according to a third embodiment of the present application.

FIG. 3A is a flowchart of a host platform-based mini program running method according to a third embodiment of the present application. This embodiment is applicable to a case where a mini program calls a terminal capability interface by calling a platform layer interface. The method may be executed by a host platform-based mini program running apparatus. The apparatus is implemented by software, hardware, or a combination of software and hardware and preferably configured in an electronic device such as a smartphone, a smartwatch, a tablet computer, or a notebook computer. As shown in FIG. 3A, the method is executed by a host platform layer and, for example, includes steps described below.

In S310, a call request for a platform layer interface is acquired from a mini program running in the host platform layer.

In an embodiment of the present application, the platform layer interface may be encapsulated and formed in advance by the host platform layer according to the application interface implementation method in the host platform layer in any embodiment of the present application. After the host platform layer encapsulates and forms at least one platform layer interface, the host platform layer may load the at least one platform layer interface into a swan map for the mini program running in the host platform layer to call. When the mini program sends the call request for the platform layer interface to the host platform layer, the host platform layer may acquire a specific platform layer interface in the swan map according to a key corresponding to the platform layer interface and carried in the call request.

In S320, the call request is processed according to a processor of the platform layer interface, or according to a concept mapping relationship of the platform layer interface, or according to a processor and a concept mapping relationship of the platform layer interface.

In an embodiment of the present application, the host platform layer may process a parameter in the call request by use of a series of processors according to the mapping relationship of the processor name between the platform layer interface and the terminal capability interface, or according to the concept mapping relationship between the platform layer interface and the terminal capability interface, or according to the mapping relationship of the processor name and the concept mapping relationship between the platform layer interface and the terminal capability interface through a call program of an Invoke factory.

In S330, the terminal capability interface corresponding to the platform layer interface is called according to the processed call request.

In an embodiment of the present application, the host platform layer transmits the processed call request to the terminal capability interface, so as to call the terminal capability interface.

In S340, a call result fed back by the terminal capability interface is acquired.

In an embodiment of the present application, the NA layer may feed back the call result to the host platform layer by performing the local callback function processing or remote callback function processing.

In S350, the call result is processed according to the processor of the platform layer interface, or according to the concept mapping relationship of the platform layer interface, or according to the processor and the concept mapping relationship of the platform layer interface, and the processed call result is fed back to the mini program.

In an embodiment of the present application, the host platform layer may process the call result by use of a series of processors according to the mapping relationship of the processor name between the platform layer interface and the terminal capability interface, according to the concept mapping relationship between the platform layer interface and the terminal capability interface, or according to the mapping relationship of the processor name and the concept mapping relationship between the platform layer interface and the terminal capability interface and execute a developer callback function to feed back the processed call result to the mini program.

Figure 3B:
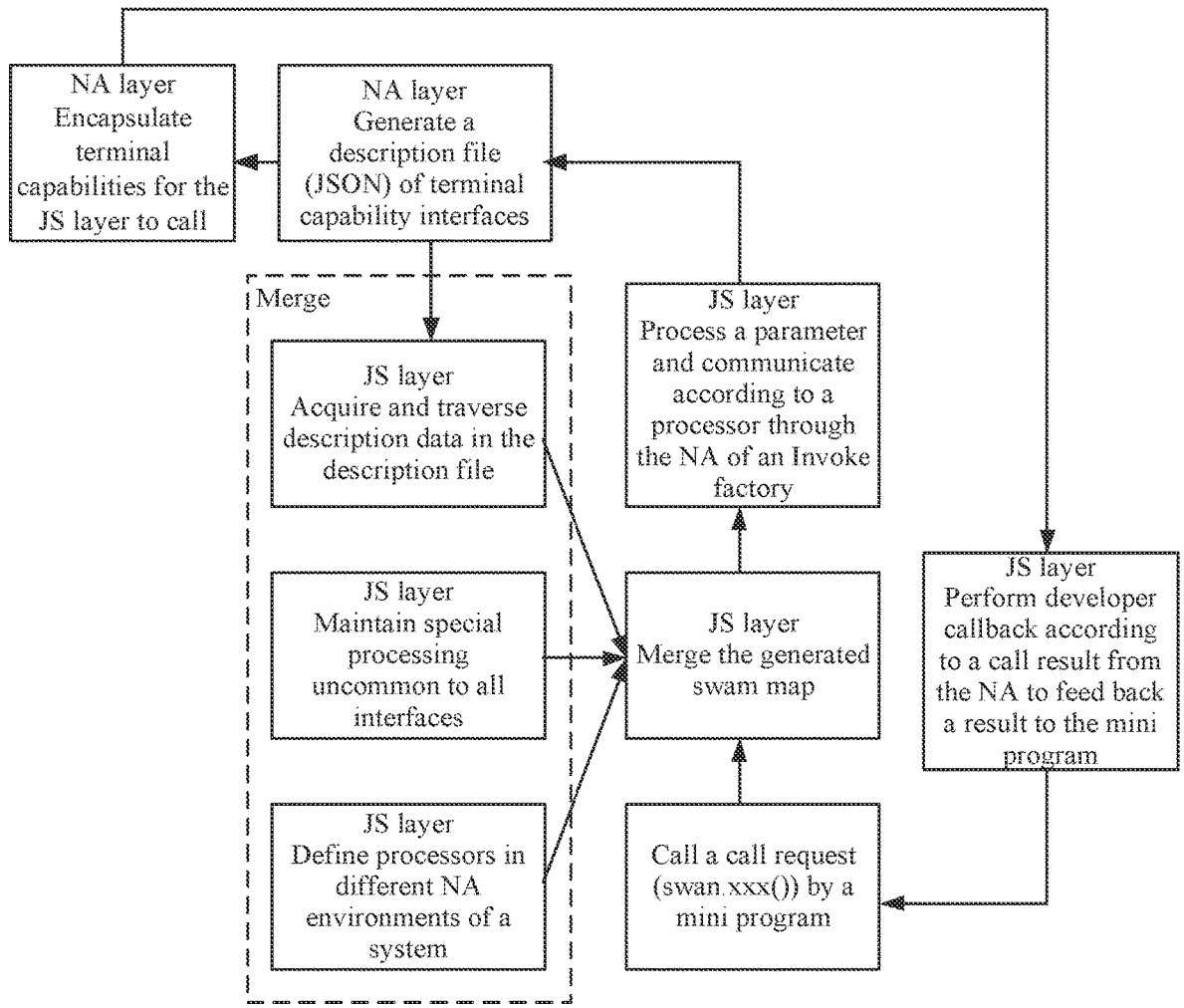
FIG. 3B is a block diagram of a host platform-based mini program running method according to a third embodiment of the present application.

Exemplarily, FIG. 3B is a block diagram of a host platform-based mini program running method according to a third embodiment of the present application. As shown in FIG. 3B, a JS layer is the host platform layer, and the mini program may be hosted in the JS layer and call the terminal capability of the NA through the JS layer.

As shown in FIG. 3B, before the mini program calls the platform layer interface of the JS layer, the NA layer may generate one piece of description data for each terminal capability interface, integrate description data of multiple terminal capability interfaces into a description file (for example, a JSON object), and sends the description file to the JS layer in advance. The dashed box in FIG. 3B includes steps for merging the description file into a swan map after the JS layer receives the description file. For example, the steps may include: acquiring and traversing description data of each terminal capability interface in the description file; parsing the description data to acquire a communication mode of each terminal capability interface, for example, at least one of a name (Name), an incoming parameter, an outgoing parameter, and array types thereof (Args), a communication bridge or a communication function (Method), or a processor name (Invoke) of each terminal capability interface; maintaining special processing uncommon to all interfaces according to the communication mode, that is, configuring the concept mapping relationship between the platform layer interface and the terminal capability interface according to the communication mode; and defining processors in different NA environments of a system according to the communication mode, that is, configuring the mapping relationship of the processor name between the platform layer interface and the terminal capability interface according to the communication mode.

Referring to FIG. 3B, when the mini program sends the call request swan.xxx( ) to the JS layer, the JS layer may acquire the specific platform layer interface from the swan map according to the key corresponding to the platform layer interface and carried in the call request, and the JS layer processes the parameter in the call request by use of a series of processors according to the mapping relationship of the processor name between the platform layer interface and the terminal capability interface, or according to the concept mapping relationship between the platform layer interface and the terminal capability interface, or according to the mapping relationship of the processor name and the concept mapping relationship between the platform layer interface and the terminal capability interface through the call program of the Invoke factory, so as to invoke to the NA layer. The NA layer calls the encapsulated terminal capability interface according to the processed call request and may call back the processing result to the JS layer by executing local/remote callback. After processing a callback result returned by the NA layer as a result required by the mini program, the JS layer executes developer callback to call back the result to the mini program. In this manner, the host platform-based mini program running method is implemented.

According to the technical scheme in this embodiment, the host platform layer acquires the call request for the platform layer interface from the mini program, such that the call request and the call result fed back by the terminal capability interface are processed through the platform layer interface, and the mini program calls the terminal capability through the host platform layer. In this embodiment, the platform layer interface is encapsulated and formed by the application interface implementation method in the host platform layer in any embodiment of the present application, thereby avoiding the frequent maintenance of codes of the interface in the host platform layer in large amounts due to the difference of the terminal hardware, versions of the operating system, or the like and reducing interface maintenance costs.

Fourth Embodiment

Figure 4:
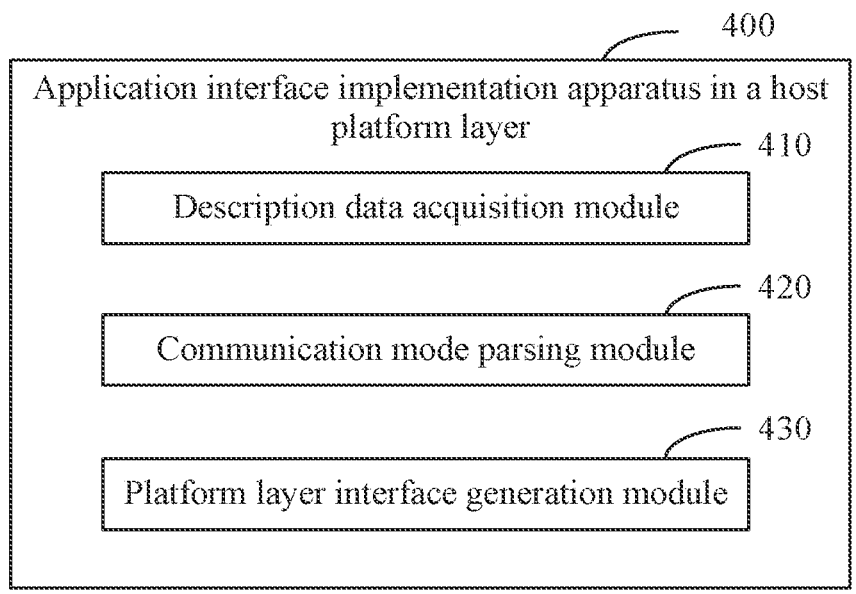
FIG. 4 is a structure diagram of an application interface implementation apparatus in a host platform layer according to a fourth embodiment of the present application.

FIG. 4 is a structure diagram of an application interface implementation apparatus in a host platform layer according to a fourth embodiment of the present application. This embodiment is applicable to a case where the host platform layer generates a platform layer interface so that a mini program calls a terminal capability interface by calling the platform layer interface. The apparatus may implement the application interface implementation method in the host platform layer in any embodiment of the present application. The apparatus 400 is integrated into the host platform layer and, for example, includes a description data acquisition module 410, a communication mode parsing module 420, and a platform layer interface generation module 430.

The description data acquisition module 410 is configured to acquire description data of the terminal capability interface.

The communication mode parsing module 420 is configured to parse the description data to acquire a communication mode of the terminal capability interface.

The platform layer interface generation module 430 is configured to configure a corresponding processor according to the communication mode, or configure a corresponding concept mapping relationship according to the communication mode, or configure a corresponding processor and a corresponding concept mapping relationship according to the communication mode to encapsulate a platform layer interface of the terminal capability interface, where the platform layer interface is configured to process data of communication interactions in a process of a mini program calling the terminal capability interface through the host platform layer.

In an embodiment, the platform layer interface generation module includes a concept mapping relationship configuration submodule.

The concept mapping relationship configuration submodule is, for example, configured to perform operations described below.

In response to a name of a current host platform layer existing within a host scenario range declared in the communication mode, a mapping relationship between a name of the terminal capability interface and a host scenario name is established, and an interface parameter of the terminal capability interface corresponding to the current host platform layer is determined.

In an embodiment, the processor has a type including at least one of a parameter type check processor, a parameter serialization processor, a return value deserialization processor, a set rule encoder, a set rule decoder, a parameter calculator, a filter, a parser, a parameter splicer, a callback function processor, or a calling mode processor.

In an embodiment, the processor involves a calling stage including at least one of pre-call processing, local callback function processing, remote callback function processing, or developer callback function processing.

In an embodiment, the concept mapping relationship configuration submodule is, for example, further configured to perform an operation described below.

A mapping relationship with a name, incoming parameter, and outgoing parameter of the platform layer interface is established according to a name, incoming parameter, and outgoing parameter of the terminal capability interface that are declared in the communication mode.

In an embodiment, the concept mapping relationship configuration submodule is, for example, further configured to perform an operation described below.

A relationship with a communication call function of the platform layer interface is established according to a communication bridge or a communication function of a terminal capability that is declared in the communication mode.

In an embodiment, the concept mapping relationship configuration submodule is, for example, further configured to perform an operation described below.

A mapping relationship with a processor name provided by the host platform layer is established according to a processor name declared in the communication mode.

In an embodiment, the platform layer interface generation module includes a processor configuration submodule.

The processor configuration submodule is, for example, configured to perform operations described below.

A corresponding general-purpose processor is queried from a predefined processor library according to a processor function declared in the communication mode; and the general-purpose processor is changed according to the processor function declared in the communication mode so that a configured extended processor is formed.

In an embodiment, the description data acquisition module is, for example, configured to perform an operation described below.

A description file into which description data of multiple terminal capability interfaces is integrated is acquired and parsed so that the description data is acquired.

In an embodiment, the description data acquisition module is, for example, configured to perform an operation described below.

The description data of the terminal capability interface that is actively reported is received. Alternatively, an update of the description data of the terminal capability interface is requested before or during initial running of the mini program.

According to the technical scheme in this embodiment, the functions such as configuring the concept mapping relationship about the interface name, the incoming parameter, the outgoing parameter, and the array types thereof, the communication bridge or the communication function, and the processor name between the terminal capability interface and the platform layer interface and configuring the corresponding processor according to the processor name are implemented through the cooperation between all function modules. The host platform layer may acquire the communication mode of the terminal capability interface by parsing the description data of the terminal capability interface provided by an NA layer and configure the processor according to the communication mode, or configure the concept mapping relationship according to the communication mode, or configure the processor and the concept mapping relationship according to the communication mode so that the platform layer interface of the terminal capability interface can be automatically generated, thereby avoiding the frequent maintenance of codes of the platform layer interface in large amounts due to the difference of the terminal hardware, versions of the operating system, or the like and reducing manual maintenance costs of the platform layer interface. Moreover, the NA layer only needs to pay attention to the generation of the description data and the host platform layer only needs to encapsulate the platform layer interface according to the description data so that the NA layer and the host platform layer have clear functions, avoiding a blurred boundary between functions. In addition, the NA layer may be constrained to generate uniform and standard description data to some extent, avoiding confusing management of the NA layer.

Fifth Embodiment

Figure 5:
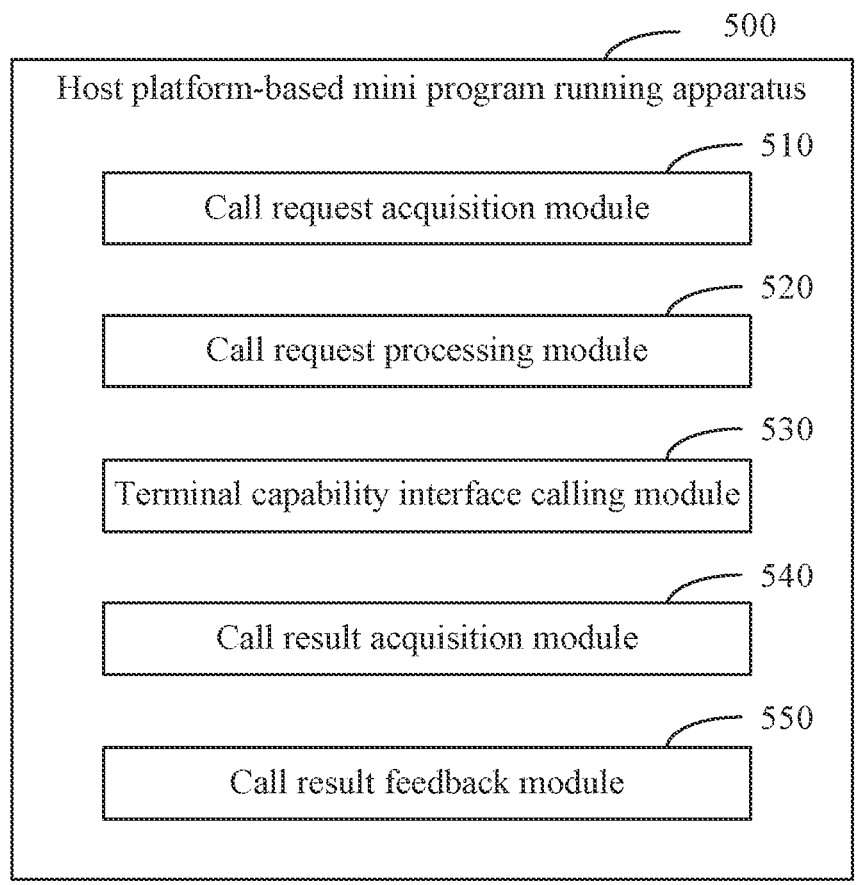
FIG. 5 is a structure diagram of a host platform-based mini program running apparatus according to a fifth embodiment of the present application.

FIG. 5 is a structure diagram of a host platform-based mini program running apparatus according to a fifth embodiment of the present application. This embodiment is applicable to a case where a mini program calls a terminal capability interface by calling a platform layer interface. The apparatus may implement the host platform-based mini program running method in any embodiment of the present application. The apparatus 500 is integrated into a host platform layer and, for example, includes a call request acquisition module 510, a call request processing module 520, a terminal capability interface calling module 530, a call result acquisition module 540, and a call result feedback module 550.

The call request acquisition module 510 is configured to acquire a call request for the platform layer interface from the mini program running in the host platform layer.

The call request processing module 520 is configured to process the call request according to a processor of the platform layer interface, or according to a concept mapping relationship of the platform layer interface, or according to a processor and a concept mapping relationship of the platform layer interface.

The terminal capability interface calling module 530 is configured to call the terminal capability interface corresponding to the platform layer interface according to the processed call request.

The call result acquisition module 540 is configured to acquire a call result fed back by the terminal capability interface.

The call result feedback module 550 is configured to process the call result according to the processor of the platform layer interface, or according to the concept mapping relationship of the platform layer interface, or according to the processor and the concept mapping relationship of the platform layer interface, and feed back the processed call result to the mini program.

According to the technical scheme in this embodiment, the function of the mini program calling a terminal capability is implemented through the cooperation between all function modules. In the embodiment of the present application, the host platform layer acquires the call request for the platform layer interface from the mini program, and the call request and the call result fed back by the terminal capability interface are processed through the platform layer interface so that the mini program calls the terminal capability through the host platform layer. In this embodiment, the platform layer interface is encapsulated and formed by the application interface implementation method in the host platform layer in any embodiment of the present application, thereby avoiding the frequent maintenance of codes of an interface in the host platform layer in large amounts due to the difference of the terminal hardware, the version of the operating system, or the like and reducing interface maintenance costs.

Sixth Embodiment

According to an embodiment of the present application, the present application further provides an electronic device and a readable storage medium.

Figure 6:
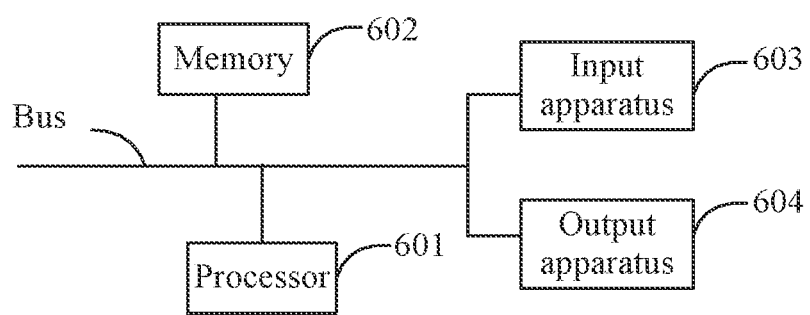
FIG. 6 is a block diagram of an electronic device for implementing an application interface implementation method in a host platform layer according to an embodiment of the present application.

FIG. 6 is a block diagram of an electronic device for an application interface implementation method in a host platform layer or a host platform-based mini program running method according to an embodiment of the present application. The electronic device is intended to represent each form of digital computers, for example, laptop computers, desktop computers, worktables, personal digital assistants, servers, blade servers, mainframe computers and other applicable computers. The electronic device may also represent each form of mobile apparatuses, for example, personal digital assistants, cellphones, smartphones, wearable devices and other similar computing apparatuses. Herein the shown components, the connections and relationships of these components, and the functions of these components are illustrative only and are not intended to limit the implementation of the present application as described or claimed herein.

As shown in FIG. 6, the electronic device includes one or more processors 601, a memory 602, and interfaces for connecting components, where the interfaces include a high-speed interface and a low-speed interface. The components are interconnected to each other by different buses and may be mounted on a common mainboard or in other manners as desired. The processor may process instructions executed in the electronic device, including instructions stored in or on the memory to make graphic information of a graphical user interface (GUI) displayed on an external input/output apparatus such as a display device coupled to an interface. In other embodiments, if required, multiple processors, or multiple buses, or multiple processors and multiple buses may be used with multiple memories. Similarly, multiple electronic devices may be connected, each providing some necessary operations, for example, as a server array, a set of blade servers or a multi-processor system. FIG. 6 uses one processor 601 as an example.

The memory 602 is a non-transitory computer-readable storage medium provided in the present application. The memory stores instructions executable by at least one processor to cause the at least one processor to perform the application interface implementation method in the host platform layer or the host platform-based mini program running method provided in the present application. The non-transitory computer-readable storage medium of the present application stores computer instructions for causing a computer to perform the application interface implementation method in the host platform layer or the host platform-based mini program running method provided in the present application.

The memory 602 as the non-transitory computer-readable storage medium may be configured to store a non-transitory software program, a non-transitory computer-executable program, and modules, for example, program instructions/modules corresponding to the application interface implementation method in the host platform layer in embodiments of the present application, such as the description data acquisition module 410, the communication mode parsing module 420, and the platform layer interface generation module 430 shown in FIG. 4, or program instructions/modules corresponding to the host platform-based mini program running method in embodiments of the present application, such as the call request acquisition module 510, the call request processing module 520, the terminal capability interface calling module 530, the call result acquisition module 540, and the call result feedback module 550 shown in FIG. 5. The processor 601 executes non-transitory software programs, instructions and modules stored in the memory 602 to execute various function applications and data processing of a server, that is, implement the application interface implementation method in the host platform layer or the host platform-based mini program running method provided in the preceding method embodiments.

The memory 602 may include a program storage region and a data storage region. The program storage region may store an operating system and an application required by at least one function. The data storage region may store data created based on the use of the electronic device for the application interface implementation method in the host platform layer or the host platform-based mini program running method. In addition, the memory 602 may include a high-speed random-access memory and a non-transitory memory, for example, at least one disk memory, a flash memory or another non-transitory solid-state memory. In some embodiments, the memory 602 optionally includes memories disposed remote from the processor 601, and these remote memories may be connected, through a network, to the electronic device for the application interface implementation method in the host platform layer or the host platform-based mini program running method. Examples of the preceding network include, but are not limited to, the Internet, an intranet, a local area network, a mobile communication network and a combination thereof.

The application interface implementation method in the host platform layer or the host platform-based mini program running method may further include an input apparatus 603 and an output apparatus 604. The processor 601, the memory 602, the input apparatus 603, and the output apparatus 604 may be connected via a bus or in other manners. FIG. 6 uses connection via a bus as an example.

The input apparatus 603 may receive inputted number or character information and generate key signal input related to user settings and function control of the electronic device for the application interface implementation method in the host platform layer or the host platform-based mini program running method. The input apparatus 603 may be, for example, a touchscreen, a keypad, a mouse, a trackpad, a touchpad, a pointing stick, one or more mouse buttons, a trackball, or a joystick. The output apparatus 604 may include, for example, a display device, an auxiliary lighting apparatus such as a light-emitting diode (LED), and a haptic feedback apparatus such as a vibration motor. The display device may include, but is not limited to, a liquid-crystal display (LCD), an LED display, or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software, or a combination thereof. The various embodiments may include implementations in one or more computer programs. The one or more computer programs are executable, interpretable, or executable and interpretable on a programmable system including at least one programmable processor. The programmable processor may be a dedicated or general-purpose programmable processor for receiving data and instructions from a storage system, at least one input apparatus, and at least one output apparatus and transmitting the data and instructions to the storage system, the at least one input apparatus, and the at least one output apparatus.

These computing programs, also referred to as programs, software, software applications or codes, include machine instructions of a programmable processor. These computing programs may be implemented in a high-level procedural, object-oriented programming language, or an assembly/machine language. As used herein, the term "machine-readable medium" or "computer-readable medium" refers to any computer program product, device or apparatus for providing machine instructions and/or data for a programmable processor, such as a magnetic disk, an optical disk, a memory, or a programmable logic device (PLD). The term "machine-readable medium" or "computer-readable medium" includes a machine-readable medium for receiving machine instructions as machine-readable signals. The term "machine-readable signal" refers to any signal for providing machine instructions or data for a programmable processor.

In order to provide an interaction with a user, the systems and techniques described herein may be implemented on a computer. The computer has a display apparatus for displaying information to the user, such as a cathode-ray tube (CRT) or an LCD monitor, a keyboard and a pointing apparatus such as a mouse or a trackball through which the user may provide input to the computer. Other types of apparatuses may also be used for providing interaction with a user. For example, feedback provided for the user may be sensory feedback in any form, for example, visual feedback, auditory feedback, or haptic feedback. Moreover, input from the user may be received in any form including acoustic input, voice input, or haptic input.

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communications, for example, a communication network. Examples of the communication network include a local area network (LAN), a wide area network (WAN), the Internet, and a blockchain network.

The computing system may include clients and servers. A client and a server are generally remote from each other and typically interact through a communication network. The relationship between the client and the server arises by virtue of computer programs running on the respective computers and having a client-server relationship with each other.

According to the technical schemes in embodiments of the present application, a host platform layer may acquire a communication mode of a terminal capability interface by parsing description data of the terminal capability interface provided by an NA layer and configure a processor according to the communication mode, or configure a concept mapping relationship according to the communication mode, or configure a processor and a concept mapping relationship according to the communication mode so that a platform layer interface of the terminal capability interface can be automatically generated, thereby avoiding the frequent maintenance of codes of the platform layer interface in large amounts due to the difference of the terminal hardware, versions of the operating system, or the like and reducing manual maintenance costs of the platform layer interface. Moreover, the NA layer only needs to pay attention to the generation of the description data and the host platform layer only needs to encapsulate the platform layer interface according to the description data so that the NA layer and the host platform layer have clear functions, avoiding a blurred boundary between functions. In addition, the NA layer may be constrained to generate uniform and standard description data to some extent, avoiding confusing management of the NA layer.

In addition, in the case where a name of the host platform layer exists in a host scenario range declared in the communication mode, a mapping relationship between names and parameters of the terminal capability interface and a host platform layer interface is flexibly configured, so as to adapt to the configuration of concept mapping relationships in different host environments.

In addition, the host platform layer defines different types of processors, so as to implement corresponding processing on different call requests of a mini program and different call results fed back by the terminal capability interface and call back a processed call result in different manners.

In addition, at a stage before the terminal capability interface is called, a stage at which a call result fed back by a local/remote terminal capability interface is called back, and a stage at which the call result is fed back to the mini program, the host platform layer may process the call request and the call result separately through processors and call back the processed call result in different manners.

In addition, the host platform layer establishes the mapping relationship between the name of the terminal capability interface and the name of the platform layer interface, the mapping relationship between the incoming parameter of the terminal capability interface and the incoming parameter of the platform layer interface, and the mapping relationship between the outgoing parameter of the terminal capability interface and the outgoing parameter of the platform layer interface, thereby implementing flexible mapping of names and parameters between the terminal capability interface and the platform layer interface.

In addition, the host platform layer establishes the relationship between the communication bridge or the communication function of the terminal capability and the communication call function of the platform layer interface, thereby implementing the communications between the terminal capability interface and the host platform layer.

In addition, the host platform layer establishes the mapping relationship between the declared processor name and at least one processor name provided by the host platform layer and may search for the corresponding processor according to the at least one processor name so that the host platform layer flexibly combines a series of processors according to the declared processor name.

In addition, the host platform layer searches for and changes a general-purpose processor according to the declared processor function, so as to process the call request and the call result and call back the processed call result in different manners according to the searched and changed processor.

In addition, the NA layer integrates description data of multiple terminal capabilities into a description file so that the host platform layer can acquire the description data of multiple terminal capability interfaces in batches, which facilitates the automatic generation of multiple platform layer interfaces at the same time.

In addition, the NA layer may actively report or passively report as requested the description data of the terminal capability interface to the host platform layer. Therefore, when a communication mode between the NA layer and the host platform layer changes, the host platform layer does not need to modify codes of the platform layer interface and simply automatically re-generates the platform layer interface according to updated description data, which helps the platform layer interface automatically adapt to the change of the communication mode.

It is to be understood that various forms of the preceding flows may be used, with steps reordered, added, or removed. For example, the steps described in the present application may be executed in parallel, in sequence, or in a different order as long as the desired result of the technical schemes disclosed in the present application is achieved. The execution sequence of these steps is not limited herein.

The scope of the present application is not limited to the preceding embodiments. It is to be understood by those skilled in the art that various modifications, combinations, subcombinations, and substitutions may be made depending on design requirements and other factors. Any modifications, equivalent substitutions, improvements, and the like made within the spirit and principle of the present application are within the scope of the present application.

What is claimed is:

1. An application interface implementation method in a host platform layer, executed by the host platform layer where a mini program is installed, comprising:
    acquiring description data of a terminal capability interface;
    parsing the description data to acquire a communication mode of the terminal capability interface, wherein the communication mode of the terminal capability interface comprises at least one of: a name of the terminal capability interface; an incoming parameter, an outgoing parameter and array types thereof of the terminal capability interface; a communication bridge of a terminal capability or a communication function of the terminal capability; or a processor name of the terminal capability interface; and
    configuring, according to the communication mode, one of a mapping relationship of a platform layer interface, or the mapping relationship and a processor of the platform layer interface to encapsulate and form the platform layer interface corresponding to the terminal capability interface;
    wherein the platform layer interface is configured to process data of communication interactions in a process of the mini program calling the terminal capability interface through the host platform layer;

wherein the mapping relationship of the platform layer interface comprises at least one of: a mapping relationship between the name of the terminal capability interface and a name of the platform layer interface; a mapping relationship between the incoming parameter of the terminal capability interface and an incoming parameter of the platform layer interface; a mapping relationship between the outgoing parameter of the terminal capability interface and an outgoing parameter of the platform layer interface; a mapping relationship between a communication call function of the platform layer interface and the communication bridge of the terminal capability or the communication function of the terminal capability; or a mapping relationship between the processor name of the terminal capability interface and at least one processor name provided by the host platform layer; and wherein configuring the mapping relationship according to the communication mode comprises: in response to a name of the host platform layer where the mini program calling the terminal capability interface is installed exists within names of host platform layers declared in the communication mode, establishing a mapping relationship between the name of the terminal capability interface and the name of the host platform layer, and determining an interface parameter of the terminal capability interface corresponding to the host platform layer.

2. The method of claim 1, wherein the processor has a type comprising at least one of a parameter type check processor, a parameter serialization processor, a return value deserialization processor, a set rule encoder, a set rule decoder, a parameter calculator, a filter, a parser, a parameter splicer, a callback function processor, or a calling mode processor.

3. The method of claim 1, wherein the processor involves a calling stage comprising at least one of pre-call processing, local callback function processing, remote callback function processing, or developer callback function processing.

4. The method of claim 1, wherein configuring the mapping relationship according to the communication mode comprises:
establishing the mapping relationship between the name of the platform layer interface and the name of the terminal capability interface, the mapping relationship between the incoming parameter of the platform layer interface and the incoming parameter of the terminal capability interface, and the mapping relationship between the outgoing parameter of the platform layer interface and the outgoing parameter of the terminal capability interface according to the name of the terminal capability interface, the incoming parameter of the terminal capability interface, and the outgoing parameter of the terminal capability interface that are declared in the communication mode.

5. The method of claim 1, wherein configuring the mapping relationship according to the communication mode comprises:
establishing the mapping relationship between the communication call function of the platform layer interface and one of the communication bridge of the terminal capability or the communication function of the terminal capability according to the communication bridge or the communication function of the terminal capability that is declared in the communication mode.

6. The method of claim 1, wherein configuring the mapping relationship according to the communication mode comprises:
establishing the mapping relationship between the at least one processor name provided by the host platform layer and the processor name declared in the communication mode according to the processor name declared in the communication mode.

7. The method of claim 1, wherein configuring the processor according to the communication mode comprises:
querying a corresponding general-purpose processor from a predefined processor library according to a processor function declared in the communication mode; and
changing the general-purpose processor according to the processor function declared in the communication mode to form a configured extended processor.

8. The method of claim 1, wherein acquiring the description data of the terminal capability interface comprises:
acquiring a description file into which description data of a plurality of terminal capability interfaces is integrated, and parsing the description file to acquire the description data.

9. The method of claim 1, wherein acquiring the description data of the terminal capability interface comprises:
receiving the description data of the terminal capability interface reported by a native program layer; or
requesting an update of the description data of the terminal capability interface before or during initial running of the mini program.

10. The method of claim 1 further comprising:
acquiring a call request for a platform layer interface from a mini program running in the host platform layer, wherein the platform layer interface is encapsulated and formed by the interface implementation method in the host platform layer;
processing the call request according to one of the processor of the platform layer interface, the mapping relationship of the platform layer interface, or the processor and the mapping relationship of the platform layer interface;
calling the terminal capability interface corresponding to the platform layer interface according to the processed call request;
acquiring a call result fed back by the terminal capability interface; and processing the call result according to one of the processor of the platform layer interface, the mapping relationship of the platform layer interface, or the processor and the mapping relationship of the platform layer interface, and feeding back the processed call result to the mini program.

11. An electronic device, comprising:
at least one processor; and
a memory communicatively connected to the at least one processor;
wherein the memory stores instructions executable by the at least one processor, and the instructions are executed by the at least one processor to cause the at least one processor to perform:
acquiring description data of a terminal capability interface;
parsing the description data to acquire a communication mode of the terminal capability interface, wherein the communication mode of the terminal capability interface comprises at least one of: a name of the terminal capability interface; an incoming parameter, an outgoing parameter and array types thereof of the terminal capability interface; a communication bridge of a terminal capability or a communication function of the terminal capability; or a processor name of the terminal capability interface; and configuring, according to the communication mode, one of a mapping relationship of a platform layer interface, or the mapping relationship and a processor of the platform layer interface to encapsulate and form the platform layer interface corresponding to the terminal capability interface;

wherein the platform layer interface is configured to process data of communication interactions in a process of a mini program calling the terminal capability interface through a host platform layer where the mini program is installed;

wherein the mapping relationship of the platform layer interface comprises at least one of: a mapping relationship between the name of the terminal capability interface and a name of the platform layer interface; a mapping relationship between the incoming parameter of the terminal capability interface and an incoming parameter of the platform layer interface; a mapping relationship between the outgoing parameter of the terminal capability interface and an outgoing parameter of the platform layer interface; a mapping relationship between a communication call function of the platform layer interface and the communication bridge of the terminal capability or the communication function of the terminal capability; or a mapping relationship between the processor name of the terminal capability interface and at least one processor name provided by the host platform layer; and wherein configuring the mapping relationship according to the communication mode comprises: in response to a name of the host platform layer where the mini program calling the terminal capability interface is installed exists within names of host platform layers declared in the communication mode, establishing a mapping relationship between the name of the terminal capability interface and the name of the host platform layer, and determining an interface parameter of the terminal capability interface corresponding to the host platform layer.

12. The electronic device of claim 11, wherein the computer instruction is configured to cause the computer to perform configuring the mapping relationship according to the communication mode by:

establishing the mapping relationship between the name of the platform layer interface and the name of the terminal capability interface, the mapping relationship between the incoming parameter of the platform layer interface and the incoming parameter of the terminal capability interface, and the mapping relationship between the outgoing parameter of the platform layer interface and the outgoing parameter of the terminal capability interface according to the name of the terminal capability interface, the incoming parameter of the terminal capability interface, and the outgoing parameter of the terminal capability interface that are declared in the communication mode.

13. The electronic device of claim 11, wherein the computer instruction is configured to cause the computer to perform configuring the mapping relationship according to the communication mode by:

establishing the mapping relationship between the communication call function of the platform layer interface and one of the communication bridge of the terminal capability or the communication function of the terminal capability according to the communication bridge or the communication function of the terminal capability that is declared in the communication mode.

14. The electronic device of claim 11, wherein the computer instruction is configured to cause the computer to perform configuring the mapping relationship according to the communication mode by:

establishing the mapping relationship between the at least one processor name provided by the host platform layer and the processor name declared in the communication mode according to the processor name declared in the communication mode.

15. The electronic device of claim 11, wherein the computer instruction is configured to cause the computer to perform configuring the processor according to the communication mode by:

querying a corresponding general-purpose processor from a predefined processor library according to a processor function declared in the communication mode; and changing the general-purpose processor according to the processor function declared in the communication mode to form a configured extended processor.

16. The electronic device of claim 11, wherein the computer instruction is configured to cause the computer to perform acquiring the description data of the terminal capability interface by:

acquiring a description file into which description data of a plurality of terminal capability interfaces is integrated, and parsing the description file to acquire the description data.

17. The electronic device of claim 11, wherein the computer instruction is configured to cause the computer to perform acquiring the description data of the terminal capability interface by:

receiving the description data of the terminal capability interface reported by a native program layer; or requesting an update of the description data of the terminal capability interface before or during initial running of the mini program.

18. A non-transitory computer-readable storage medium, storing a computer instruction, wherein the computer instruction is configured to cause a computer to perform:

acquiring description data of a terminal capability interface;

parsing the description data to acquire a communication mode of the terminal capability interface, wherein the communication mode of the terminal capability interface comprises at least one of: a name of the terminal capability interface; an incoming parameter, an outgoing parameter and array types thereof of the terminal capability interface; a communication bridge of a terminal capability or a communication function of the terminal capability; or a processor name of the terminal capability interface; and configuring, according to the communication mode, one of a mapping relationship of a platform layer interface, or the mapping relationship and a processor of the platform layer interface to encapsulate and form the platform layer interface corresponding to the terminal capability interface;

wherein the platform layer interface is configured to process data of communication interactions in a process of a mini program calling the terminal capability interface through a host platform layer where the mini program is installed;

wherein the mapping relationship of the platform layer interface comprises at least one of: a mapping relationship between the name of the terminal capability interface and a name of the platform layer interface; a mapping relationship between the incoming parameter of the terminal capability interface and an incoming parameter of the platform layer interface; a mapping relationship between the outgoing parameter of the terminal capability interface and an outgoing parameter of the platform layer interface; a mapping relationship between a communication call function of the platform layer interface and the communication bridge of the terminal capability or the communication function of the terminal capability; or a mapping relationship between the processor name of the terminal capability interface and at least one processor name provided by the host platform layer; and wherein configuring the mapping relationship according to the communication mode comprises: in response to a name of the host platform layer where the mini program calling the terminal capability interface is installed exists within names of host platform layers declared in the communication mode, establishing a mapping relationship between the name of the terminal capability interface and the name of the host platform layer, and determining an interface parameter of the terminal capability interface corresponding to the host platform layer.

* * * * *